EMMA R. ADAMS.
Sewing-Machine Tables.

No. 157,185.  Patented Nov. 24, 1874.

Witnesses:
Elmon A. Adams
J. R. Nottingham

Inventor
Emma R. Adams

UNITED STATES PATENT OFFICE.

EMMA R. ADAMS, OF WASHINGTON, DISTRICT OF COLUMBIA.

IMPROVEMENT IN SEWING-MACHINE TABLES.

Specification forming part of Letters Patent No. 157,185, dated November 24, 1874; application filed November 12, 1874.

*To all whom it may concern:*

Be it known that I, EMMA R. ADAMS, of the city of Washington, in the District of Columbia, have invented certain new and useful Improvements in Sewing-Machine Tables; and I do hereby declare the following to be a full, clear, and exact description thereof, reference being had to the accompanying drawing and to the letters of reference marked thereon.

The nature of my invention consists in the construction and arrangement of a folding and swinging table, to be attached to the side of a sewing-machine, as will be hereinafter more fully set forth.

In order to enable others skilled in the art to which my invention appertains to make and use the same, I will now proceed to describe its construction and operation, referring to the annexed drawing, which forms a part of this specification, and in which—

Figure 1:
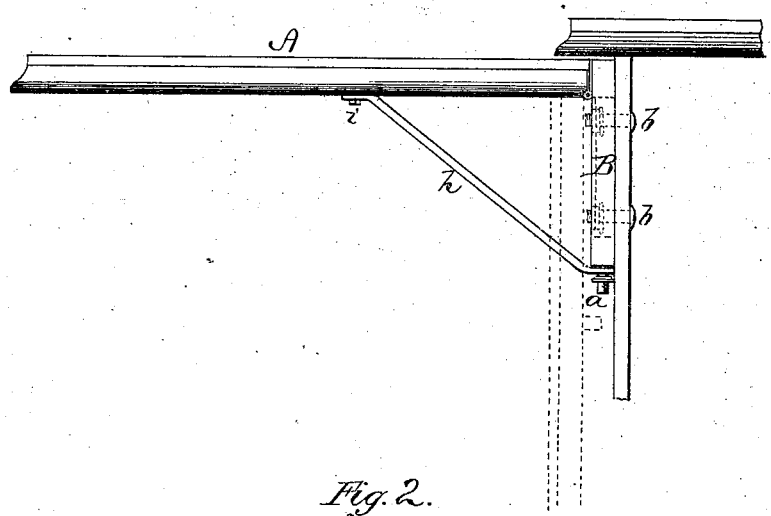
Figure 2:
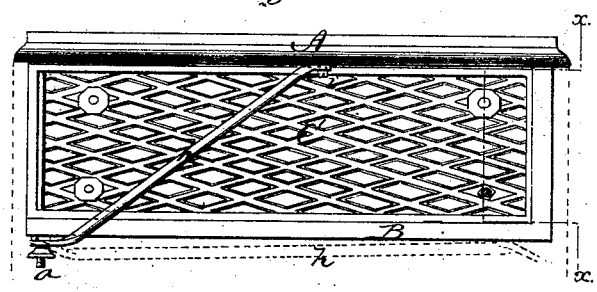
Figure 3:
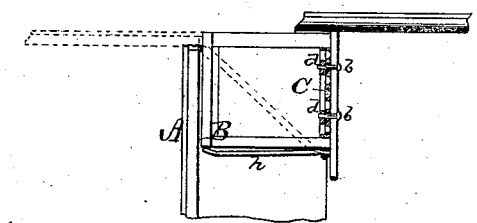

Figure 1 is a side view of my invention attached to the side of a sewing-machine. Fig. 2 is an end view of the same, and Fig. 3 is a section through the line $x\ x$, Fig. 2.

A represents a table-leaf, of any suitable dimensions, hinged at one end to a rectangular frame, B, in such a manner that it can be turned to hang down vertically when not desired for use. The frame B is three-sided—that is, it has a top and a bottom bar and one end bar. In the other end of the frame is pivoted a skeleton-plate, C, made with a series of diamond or other suitably shaped openings, as shown. The plate C is pivoted in the end of frame B by a vertical rod, $a$, passing through them, or in any other suitable manner that will allow of the frame swinging around easily. The plate C is made of such shape as to fit within the frame, and it is to be fastened to the side of a sewing-machine by means of bolts $b$ passing through any of the openings in the plate and through holes or openings in the side piece of the machine, and nuts $d\ d$ then screwed on the ends of the bolts, suitable washers being introduced to prevent the bolt-heads and nuts from going through. The plate may be attached to any sewing-machine, as the bolts can always be passed through almost any part of the plate, to allow of its easy and firm attachment. When the table is not desired for use the leaf A can then hang down along the side of the machine. When desired for use, the leaf is raised and held by means of a brace, $h$, pivoted on the lower end of the rod $a$, and placed on a pin, $i$, on the under side of the leaf. This brace lies against the under side of the frame B when not in use, as shown by dotted lines in Fig. 2. When thus raised, the leaf A extends out to one side of the machine, and, by the frame B swinging on the stationary plate C, the leaf may be brought forward to stand at the side of the operator, or it may be swung entirely around in front of the machine, and form a convenient cutting-table. If desired, the rear edge of the leaf A may be cut out in the center, the same as an ordinary lap-board, which "cut-out" will be in front when the leaf is swung around for cutting purposes. The frame B and plate C may be arranged so as to be attached to either side of the sewing-machine.

Having thus fully described my invention, what I claim as new, and desire to secure by Letters Patent, is—

The combination of the skeleton-plate C, swinging frame B pivoted thereto, leaf A hinged to the frame, and a brace, $h$, for holding the leaf up, all substantially as and for the purposes herein set forth.

EMMA R. ADAMS.

Witnesses:
ELMON A. ADAMS,
J. R. NOTTINGHAM.